(12) United States Patent
Podgurski

(10) Patent No.: US 6,528,764 B2
(45) Date of Patent: Mar. 4, 2003

(54) ENGINE EXHAUST HEATED WELDING ROD DRYING OVEN

(76) Inventor: Mark Podgurski, 168 West St., Stoughton, MA (US) 02072

( * ) Notice: Subject to any disclaimer, the term of this patent is extended or adjusted under 35 U.S.C. 154(b) by 0 days.

(21) Appl. No.: 09/900,363

(22) Filed: Jul. 7, 2001

(65) Prior Publication Data

US 2002/0003134 A1 Jan. 10, 2002

Related U.S. Application Data

(60) Provisional application No. 60/216,578, filed on Jul. 7, 2000.

(51) Int. Cl.⁷ .............................................. B23K 9/26
(52) U.S. Cl. ....................................... 219/133; 219/136
(58) Field of Search ................................ 219/133, 136, 219/137.2, 137 R

(56) References Cited

U.S. PATENT DOCUMENTS 6,075,226 A * 6/2000 Kishbaugh ................... 219/133

FOREIGN PATENT DOCUMENTS

GB 2044655 * 10/1980 ................. 219/136

* cited by examiner

*Primary Examiner*—Clifford C. Shaw
(74) *Attorney, Agent, or Firm*—Robert T. Dunn, Esq.

(57) ABSTRACT

An oven for drying welding rods that are used on electric welding equipment includes an inner oven space and an outer annular hot gas flow space around the inner oven space, the inner space being sufficiently large to accept a conventional cylindrical metal can of welding rods, adapted for feeding the hot engine exhaust gas to the annular hot gas flow space and for opening and closing the inner oven space for inserting and removing the can of welding rods therefrom and a for controlling the flow of the hot engine exhaust gas to the annular hot gas flow space so that the heat flow to the conventional can of welding rods inserted into the inner oven space is modulated and is sufficient to dry the rods by heat from the engine hot exhaust gas.

15 Claims, 3 Drawing Sheets

ENGINE EXHAUST HEATED WELDING ROD DRYING OVEN

This appln claims benefit of Prov. No. 60/216,578 filed Jul. 7, 2000.

BACKGROUND

This invention relates to apparatus for drying electric welding rods, in situs, to provide a welder with a supply of dry welding rods.

Electric welding equipment includes an engine driven generator that is often mobile, inasmuch as it is mounted on a trailer that is towed by a pick-up truck. The trailer carries the generator, electric controls, electric cable and a gasoline engine that drives the generator. The power ranges from a few horsepower to 20 to 30 horsepower. The situs is often outdoors and welding is done in all kinds of weather. A problem that arises often for the welder is that the welding rods are wet, sometimes called "contaminated", and must be dried before they can be used properly. A wet welding rod will not strike as hot an arc, nor will the arc be best located for ideal welding, as with a dry welding rod. Heretofore, welders have dealt with this problem a number of ways that range from wrapping the rods in towels to drying them in the truck cab heater.

It is an object of the present invention to provide a method and means of drying welding rods that is an integral part of the welder's equipment and is readily attached thereto.

It is a further object to provide such a method and means of drying welding rods in which the heat can be modulated.

It is a further object to provide such a method and means of drying welding rods that is adapted for attachment to the welders gasoline engine that drives the generator and is insulated from vibrations therefrom.

It is another object to provide such a method and means of drying welding rods wherein the hot exhaust gas from the engine flows around an inner cylindrical oven space that holds the welding rods so that heat flows from the gas to the rods evenly around the entire circumference of the inner oven space and along the entire length thereof.

SUMMARY OF THE INVENTION

According to the present invention an oven for drying welding rods that are used on electric welding equipment includes an inner oven space and an outer annular hot gas flow space around the inner oven space, the inner space being sufficiently large to accept a conventional metal can of welding rods, the oven being adapted for: feeding the hot engine exhaust gas to the oven annular hot gas flow space; opening and closing the inner oven space for inserting and removing the can of welding rods therefrom; and controlling the flow of the hot engine exhaust gas to the annular hot gas flow space so that the heat flow to the conventional can of welding rods inserted into the inner oven space is modulated and is sufficient to dry the rods as rapidly as desired.

These and other objects and features of the at present invention will be more apparent in view of the drawings taken in conjunction with the specific description of embodiments of the invention.

DESCRIPTION OF EMBODIMENTS OF THE INVENTION

First Embodiment

Figure 1:
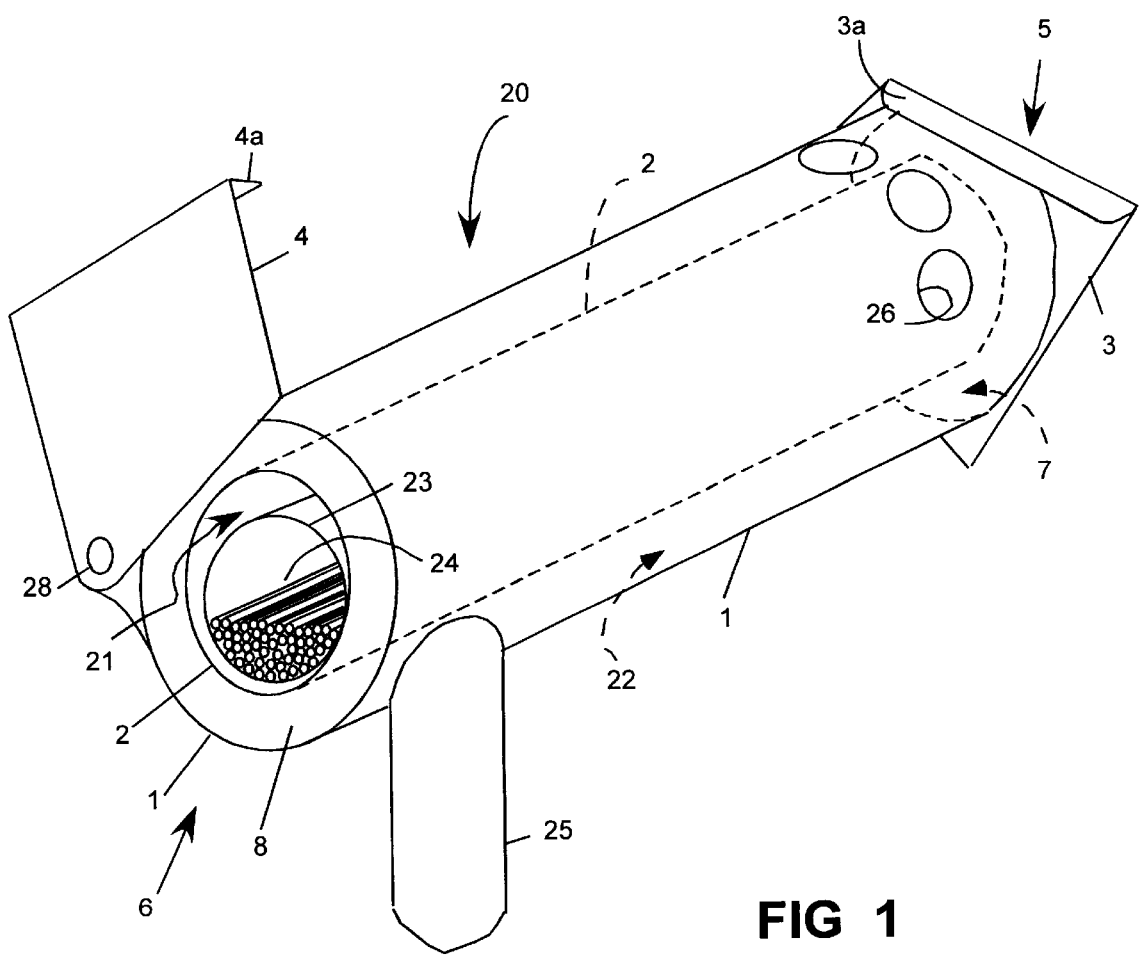
FIG. 1 is a perspective view of a first embodiment of the welding rod drying oven of the present invention.
Figure 4:
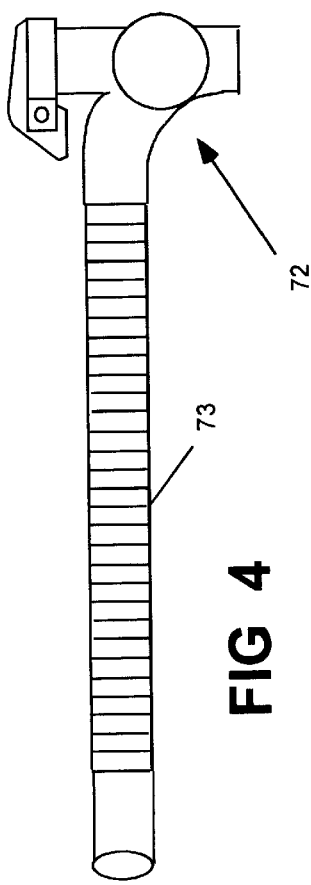
FIG. 4 shows the flexible connection from the engine exhaust pipe to the oven that includes an adjustable damper control valve for modulating heat flow (engine exhaust gas flow) to the oven.
Figure 3:
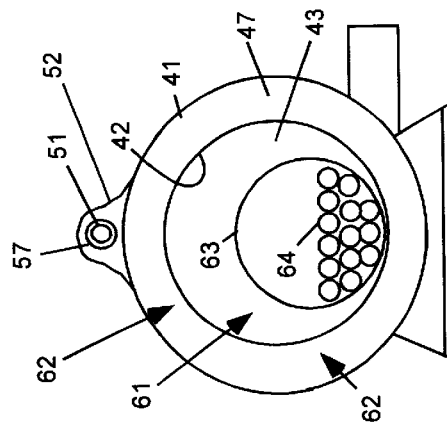
FIG. 3 is a cross-section view of the oven of FIG. 2, taken perpendicular to the axis 80, toward the hot end thereof.
Figure 2:
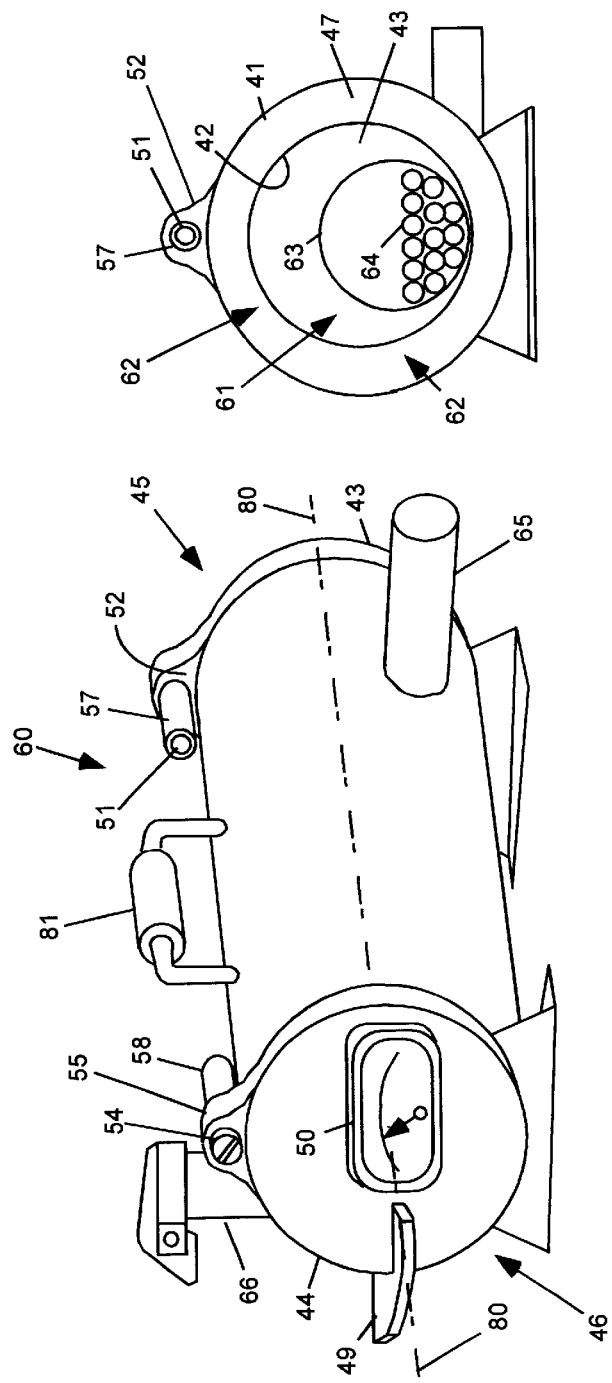
FIG. 2 is a perspective view of a second embodiment of the welding rod drying oven of the present invention adapted for attachment to the engine of the welders generator in proximity to the exhaust pipe from the engine, and including: a flexible tube for feeding hot exhaust gas from the engine to the oven, an adjustable damper control valve for modulating the hot engine exhaust gas flow to the oven and a door into the oven for loading the can of welding rods into the oven and equipped with a temperature gage.
Figure 6:
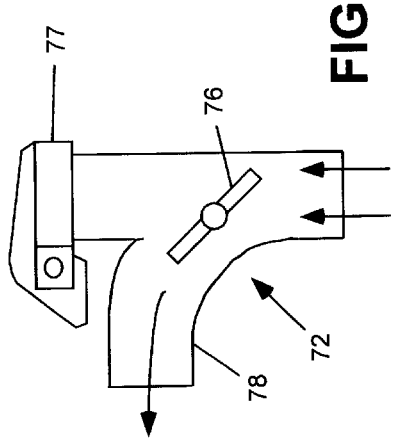
FIG. 6 is an end view of the oven of FIGS. 2 and 4 showing the loading end door rotated open for loading and unloading a can of welding rods.
Figure 7:
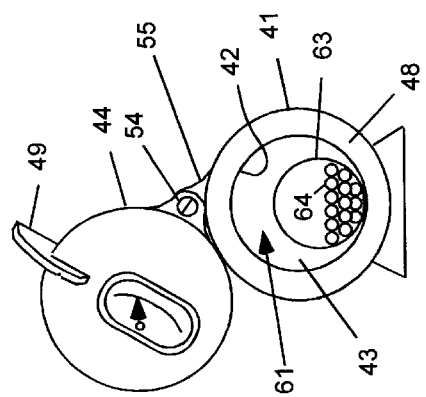
FIG. 7 is a diagram illustrating the operation of the adjustable hot gas flow modulating valve.

The first embodiment of the present invention, as shown in FIG. 1, is a welding rod drying oven denoted 20. It is of unique design which is not currently available in the market from any source. The purpose of this welding rod drying oven is to dry moisture from a conventional container (metal can) 23 of welding electrodes (welding rods) 24. These rods are consumed during the process of welding and are continually replaced as the weldment is constructed. This constant replacement requires a drying oven capable and of quickly heating a container can of the welding rods to drive out any moisture which may contaminate them.

The rod drying oven 20 is comprised of two concentric steel tubes 1 and 2, one inside the other, defining the oven axis 80. The inside tube 2 forms the inside 21 of the oven that is closed by rotatable plate 3 at the gas output t end 5 and rotatable plate 4 at the gas input end 6. This structure provides the inner cylindrical oven space 21 and an outer annular hot gas flow space 22 around the oven space. The oven space 21 is of suitable inside diameter and length to accept a conventional metal can 23 of welding rods 24. The outside tube 1 diameter is sized according to the requirements of the welding generator engine (not shown in this embodiment) on which the rod drying oven 20 is installed. The annular hot gas flow space 22 is closed at the gas output end by ring-shaped plate 7 and at the gas input end by ring-shaped plate 8. Hot exhaust gas from the engine is fed to annular space 22 at the input end by engine exhaust gas input pipe 25, which meets the space tangentially sending swirling hot engine exhaust gas through the space from the input end 6 to the output end 5 and out of exhaust gas holes 26 in the outside tube 1 to the atmosphere.

The radial orientations of the input gas pipe 25 and the output gas holes 26 is such that the gas flow out of the dryer 20 is upward, inasmuch as the dryer is usually mounted on top of the generator engine, so that it does not impinge on any of the equipment that the gas might damage or interfere with operation. This is accommodated usually by providing an engine exhaust pipe extension (not shown in this embodiment) that comes from below the dryer and so the gas input pipe 25 is oriented downward.

At each end of dryer 20 are hinged closure plates 3 and 4, which rotate to close off the oven space 21 to create a closed heated space that contains the can of welding rods to be dried out. Closure plates 3 and 4 may be identical and interchangeable and each has a pin such as pin 28 that engages a corner of the closure plate so that the plate can be rotated on the pin to open and close the end of the oven space 21. A convenient design of closure plates 3 and 4 is illustrated in FIG. 1, which shows each with a rotational stop flange 3a and 4a, respectively.

The oven can be adapted to attach directly to the welding generator engine, or it can be built with a stand and the exhaust from the engine can be fed to it with flexible tubing.

Second Embodiment

Figure 5:
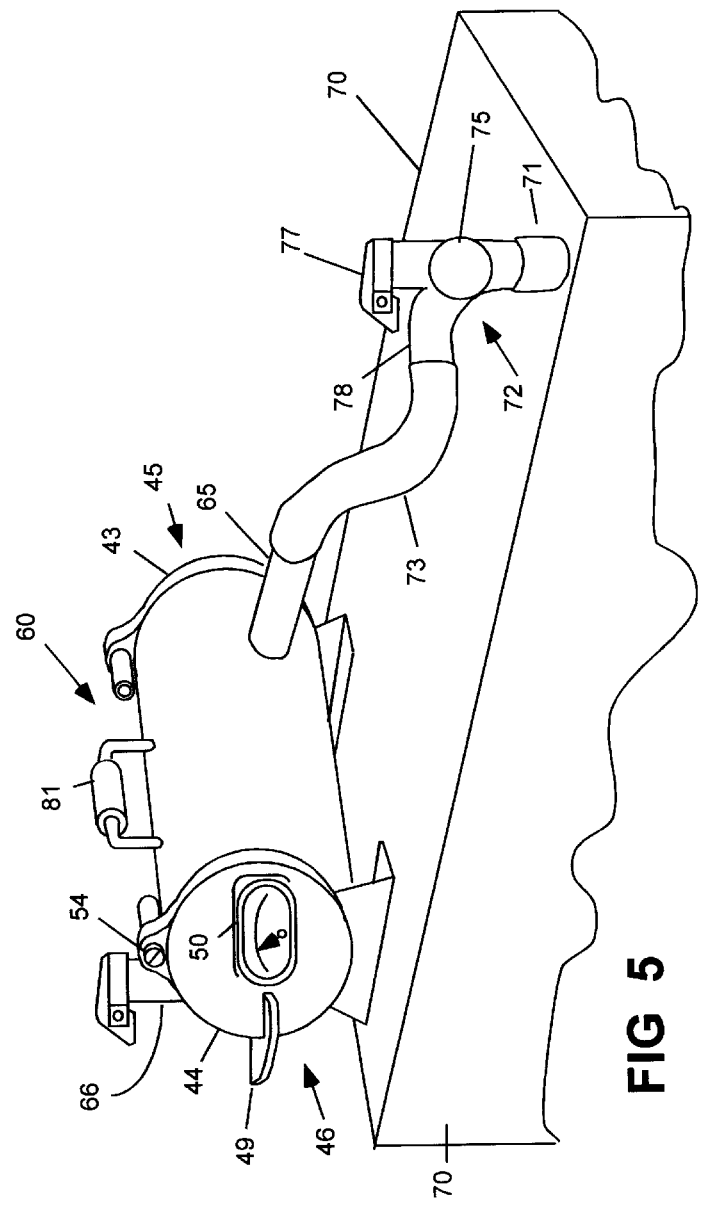
FIG. 5 shows the structures of FIGS. 2 and 3 mounted on top of the welders generator engine connected to the engine exhaust pipe.

The second embodiment of the present invention is illustrated by FIGS. 2 to 7 and is shown in FIG. 5 mounted on top of a typical welder's generator engine from which the engine exhaust pipe projects upward. As shown in FIGS. 2 to 7, in this embodiment, the welding rod drying oven, denoted 60, is of unique design which is not currently available in the market from any source. The purpose of this welding rod drying oven is to drive moisture from a conventional container (metal can) 63 of welding electrodes (welding rods) 64. These electrodes are consumed during the process of welding and are continually replaced as the weldment is constructed. This constant replacement requires a drying oven capable and of quickly heating a container can of the welding rods to drive out any moisture which may contaminate them.

The welding rod drying oven 60 is comprised of two concentric steel tubes 41 and 42, one inside the other, with the inside tube 42 forming the inside 61 of the oven that is closed by rotatable hot end door 43 at the engine exhaust input end 45 and by rotatable loading end door 44 at the loading end 46. This structure provides the inner cylindrical oven space 61 and an outer annular hot gas flow space 62 around the oven space. The oven space 61 is of suitable inside diameter and length to accept a conventional can 63 of welding rods 64. The outside tube 41 diameter is sized according to the requirements of the welding generator engine 70 on which the welding rod drying oven 60 is installed as shown in FIG. 5. The annular hot gas flow space 62 is closed at the hot end 45 by ring-shaped plate 47 (see FIG. 3) and at the loading end 46 by ring-shaped plate 48 (see FIG. 6).

Hot exhaust gas from the engine 70 exhaust pipe 71 is fed to annular space 62 at the hot end gas input pipe 65, via modulating valve 72 and flexible hose 73. Hot gas input pipe 65, meets the space 62 tangentially, sending swirling hot engine exhaust gas through the space from the hot end 45 to the loading end 46 and out of the oven exhaust gas pipe 66 to the atmosphere.

The radial orientations of the oven gas input pipe 65 and the oven gas output pipe 66 is such that the gas flow out of the dryer 60 is upward, inasmuch as the dryer is mounted on top of the welding. generator engine, as shown in FIG. 5, so that it does not impinge on any of the equipment that the gas might damage or interfere with operation.

At each end of dryer 60 are hinged closure doors 43 and 44, which can be rotated on pins to close off the oven space 61 to create a closed heated space that contains the can of welding rods to be dried out. Closure doors 43 and 44 may be identical and interchangeable and each is rotatable on a pin projecting from a boss on an end of the oven. The hot end closure door 43 is rotatable on pin 51 carried on boss 52 attached to the top of the oven at the hot end thereof (see FIG. 3). The loading end closure door 44 is rotatable on pin 54 carried on boss 55 attached to the top of the oven at the loading end thereof (see FIGS. 2, 5 and 6).

A spring load carried on each of the closure door pins is provided to exert a load forcing the door against the oven, particularly when the door is closed. For this purpose the head of each pin engages the outside of the door at a boss on the door and passes through a snug opening in the corresponding boss on the top of the oven and into a coil spring with the tail of the pin catching the end of the spring so that the spring urges the door against the open end of the oven. For this purpose, at the hot end of the oven, pin 51 holding door 43 passes through boss 52 through spring 57 and catches the end of the spring urging door 43 against the hot end of the oven. Similarly, at the loading end of the oven, pin 54 holding door 44 passes through boss 55 through spring 58 and catches the end of the spring urging door 44 against the loading end of the oven.

Handles, such as handle 49 on door 44 are provided so that the door can be rotated open or closed by hand with ease. Also a temperature indicator, such as gage 50 on the outside of door 44 may be provided on one or both doors and display the temperature inside the oven. A carrying handle 81, that is preferably thermally insulated enables the welder to move the oven even when it is hot.

CONCLUSIONS

While the inventions described herein are described in connection with several preferred embodiments, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

What is claimed is:

1. An oven for drying welding rods that are consumed when used by electric welding equipment during a weldment, that includes a combustion engine driving an electric generator, the engine producing hot exhaust gas, comprising:

(a) an inner oven space and an outer annular hot gas flow space around said inner oven space, (b) said inner oven space is large enough to accept a conventional metal can of welding rods, (c) said outer annular space size is according to the requirements of at least part of said engine hot exhaust gas flow, (d) means for feeding said engine hot exhaust gas to said annular hot gas flow space and (e) means for opening and closing said inner oven space so that said conventional metal can of welding rods can be inserted into said inner oven space and removed therefrom, (f) whereby said conventional metal can of welding rods inserted into said inner oven space is heated sufficiently to dry said rods by heat from said engine hot exhaust gas.

2. An oven as in claim 1, wherein:

(a) said annular hot gas flow space has a hot gas input end and a hot gas output end and is closed at said input end, (b) an oven gas flow input pipe is provided at said input end and (c) said means for feeding said engine hot exhaust gas to said annular hot gas flow space connects to said input pipe.

3. An oven as in claim 2, wherein:
(a) the radial orientations of said input gas pipe and the exhaust gas flow therefrom is such that the gas flow therefrom is upward and
(b) said input pipe is oriented downward.

4. An oven as in claim 1, wherein:
(a) at an end of said inner oven space is a moveable closure plate which can be moved to close said inner oven space to create a closed heated space that contains said can of welding rods to be dried out.

5. An oven as in claim 4, wherein:
(a) a moveable closure plate pivots on a pin at each end of said inner oven space.

6. An oven as in claim 1, wherein:
(a) said inner oven space and said outer annular gas flow space are provided by two concentric cylinders, an inner cylinder and an outer cylinder,
(b) said inner cylinder defines said inner oven space and
(c) said inner cylinder together with said outer cylinder define said annular hot gas flow space.

7. An oven as in claim 6, wherein:
(a) at an end of said inner oven space is a moveable closure plate which can be moved to close said inner oven space to create a closed heated space that contains said can of welding rods to be dried out.

8. An oven as in claim 7, wherein:
(a) said moveable closure plate pivots on a pin carried on said outer cylinder.

9. An oven as in claim 8, wherein:
(a) one of said moveable closure plate that pivots on a pin carried on said outer cylinder is included at each end of said inner oven space.

10. An oven as in claim 9, wherein:
(a) said annular space is closed at both ends,
(b) said input pipe is between said closed ends, closer to said hot gas input end thereof and
(c) a hot gas flow output pipe from said annular space is provided between said input pipe and said gas output end.

11. An oven for drying welding rods that are consumed when used by electric welding equipment during a weldment, that includes a combustion engine driving an electric generator, the engine producing hot exhaust gas, comprising:
(a) an inner oven space and an outer annular hot gas flow space around said inner oven space, provided by two concentric cylinders, an inner cylinder and an outer cylinder,
(b) said inner cylinder defines said inner oven space and
(c) said inner cylinder together with said outer cylinder define said annular hot gas flow space,
(d) said inner oven space is large enough to accept a conventional metal can of welding rods,
(e) said outer annular space size is according to the requirements of at least part of said engine hot exhaust gas flow,
(f) said outer annular space is closed at both ends,
(g) means are provided for feeding said engine hot exhaust gas to said annular hot gas flow space at the hot end thereof,
(h) means are provided for feeding said engine hot exhaust gas from said annular hot gas flow space at the oven loading end thereof and,
(i) means for opening and closing said inner oven space so that said conventional metal can of welding rods can be loaded into said inner oven space and removed therefrom,
(j) whereby said conventional metal can of welding rods loaded into said inner oven space is heated sufficiently to dry said rods by heat from said engine hot exhaust gas.

12. An oven as in claim 11, wherein:
(a) said means for opening and closing said inner oven space is a moveable closure plate at an end of said inner oven space which can be moved to close said inner oven space to create a closed heated space that contains said can of welding rods to be dried out.

13. An oven as in claim 12, wherein:
(a) a moveable closure plate pivots on a pin at each end of said inner oven space.

14. An oven as in claim 13, wherein:
(a) one of said moveable closure plate that pivots on a pin carried on said outer cylinder is included at each end of said inner oven space.

15. An oven as in claim 14, wherein:
(a) said annular space is closed at both ends,
(b) said input pipe is between said closed ends, closer to said hot gas input end thereof and
(c) a hot gas flow output pipe from said annular space is provided between said input pipe and said gas output end.

* * * * *